US 9,208,494 B2

(12) United States Patent
Cibor

(10) Patent No.: US 9,208,494 B2
(45) Date of Patent: Dec. 8, 2015

(54) CODE BASED PRODUCT TRACKING METHODS AND APPARATUS

(71) Applicant: TAMARIAN CARPETS, LLC, Baltimore, MD (US)

(72) Inventor: Steven Thaddeus Cibor, College Park, MD (US)

(73) Assignee: Tamarian Carpets, LLC, Baltimore, MD (US)

( * ) Notice: Subject to any disclaimer, the term of this patent is extended or adjusted under 35 U.S.C. 154(b) by 0 days.

(21) Appl. No.: 14/300,751

(22) Filed: Jun. 10, 2014

(65) Prior Publication Data

US 2014/0367463 A1 Dec. 18, 2014

Related U.S. Application Data

(60) Provisional application No. 61/834,699, filed on Jun. 13, 2013.

(51) Int. Cl.
G06F 17/00 (2006.01)
G06Q 30/00 (2012.01)

(52) U.S. Cl.
CPC ..................................... G06Q 30/00 (2013.01)

(58) Field of Classification Search
CPC ... G06Q 30/02; G06Q 10/08; G06Q 10/0833; G06Q 10/20; G06Q 20/20; G06Q 20/322; G06Q 20/3274; G06Q 30/0207; G06Q 30/0226; G06Q 30/0281; G06Q 30/06; G06Q 30/0631; G06Q 30/0637; G06Q 40/02

USPC ........ 235/375, 383, 492, 454, 472.01–472.03
See application file for complete search history.

(56) References Cited

U.S. PATENT DOCUMENTS

| | | | | |
|---|---|---|---|---|
| 2012/0130794 A1* | 5/2012 | Strieder | ..................... | 705/14.27 |
| 2013/0070068 A1* | 3/2013 | Garvey et al. | .................... | 348/61 |
| 2013/0256403 A1* | 10/2013 | MacKinnon Keith | ........ | 235/375 |
| 2013/0299569 A1* | 11/2013 | Gentile et al. | ................ | 235/375 |
| 2014/0175162 A1* | 6/2014 | Argue et al. | .................. | 235/375 |
| 2014/0259820 A1* | 9/2014 | Humphreys et al. | ........ | 40/299.01 |
| 2015/0066782 A1* | 3/2015 | Vainberg et al. | .............. | 705/305 |

* cited by examiner

Primary Examiner — Thien M Le
(74) Attorney, Agent, or Firm — K&L Gates LLP

(57) ABSTRACT

A system, method, and apparatus for using code based tracking are disclosed. An example apparatus includes a database including a product data structure configured to store (i) information indicative of a manufacturer of a woven carpet, (ii) information indicative of employees of the manufacturer that produced the woven carpet including a name and an age of each employee, (iii) information indicative of a certification inspection of the woven carpet, and (iv) information indicative of the woven carpet passing through customs. The example apparatus also includes a server configured to associate a code with the woven carpet, store the information of items (i) to (iv) to the product data structure, and make the information of items (i) to (iv) available a consumer upon receiving a message from a user device of the consumer indicative that the code was accessed by the user device.

20 Claims, 14 Drawing Sheets

| RUG #2390PLEX  CODE ID: 12209232 | | | |
|---|---|---|---|
| MANUFACTURING | | INSPECTOR | |
| MANUFACTURING COMPANY NAME ADDRESS | | NAME INSPECTION/CERTIFICATION COMPANY DATE INSPECTED PASS/FAIL/ISSUES/QUALITY | |
| PICTURE OF PRODUCT | MANUFACTURER TYPE RAW MATERIALS QUALITY SIZE/COLOR MANUFACTURING METHODS | SHIPPING | |
| | | COMPANY NAME TRACKING NUMBER LOCATIONS | |
| PICTURE | WORKER 1 JOB TITLE NAME/AGE GENDER ADDRESS TASK/TASK-WAGE DATE/TIME OF WORK COMPLETE | CUSTOMS | |
| | | CUSTOM AGENT NAME DATE CLEARED CUSTOMS | |
| | | MERCHANT | |
| | | MERCHANT NAME RETAIL LOCATION DATE IN POSSESSION | |
| PICTURE | WORKER 1 JOB TITLE NAME/AGE GENDER ADDRESS TASK/TASK-WAGE | CONSUMER | |
| | | NAME ADDRESS DEMOGRAPHIC INFORMATION DATE VIEWED PRODUCT | |
| | DATE/TIME OF WORK COMPLETE | | |

TLC03801   A31449C100   (R) 100LOOF
P   RD   2905.013 2.75×30

Name: SUNTALI   Order No. A31449
Carpet No.:   Design No.: PLANKE STONE GREY
Finished Size:   SQ. MT.:   Grade:
Starting Date: 15/5/2013 Finished Date:

| RETURNED | | DATE | W/YARN ISSUE | S/YARN ISSUE | C/YARN ISSUE |
|---|---|---|---|---|---|
| CARPET WEIGHT | | 16.15 kg | | | 3.0 |
| WOOLEN YARN RETURN | | 21/5/13 | 20.3c | | |
| COTTON YARN RETURN | | 31/5/13 | | 5.32 | |
| WOOLLEN DUST | | | | | |
| TOTAL | | | | | |
| SILK YARN USED / M² | | | | | |
| WOLLEN YARN USED / M² | | | | | |
| COTTON YARN USED / M² | | | | | |
| TOTAL S/YARN USED | | | | | |
| TOTAL W/YARN USED | | | | | |
| TOTAL C/YARN USED | | | | | |
| DEDUCT | | | | | |
| NET PAID | | | | | |
| CHECKED BY: | | | | | |

FIG. 9

Design (click to view)
Planke Raindance

Carpet#: A28132C100   Size: 10x14   Knots: 100   Quality: 80% Wool & 20% Silk

Production Details

| Carpet # | Width | Length | Delivery Details |
|---|---|---|---|
| A25453C100 | 2.75 | 12 | Delivery 7-10 Days |
| A25793C100 | 6 | 9 | Delivery 7-10 Days |
| A23417C100 | 6 | 9 | Delivery 7-10 Days |
| A29503C100 | 8 | 10 | Delivery 7-10 Days |
| A30102C100 | 8 | 10 | Delivery 7-10 Days |
| A29507C100 | 9 | 12 | Delivery 7-10 Days |
| A25456C100 | 9 | 12 | Delivery 7-10 Days |
| A24067C100 | 9 | 12 | Delivery 7-10 Days |
| A31136C100 | 9 | 12 | Delivery 7-10 Days |
| A29506C100 | 9 | 12 | Delivery 7-10 Days |
| A31137C100 | 9 | 12 | Delivery 7-10 Days |
| A28355C100 | 10 | 14 | Delivery 7-10 Days |
| A28357C100 | 10 | 14 | Delivery 7-10 Days |
| A28356C100 | 10 | 14 | Delivery 7-10 Days |
| A32412C100 | 10 | 14 | Delivery 35 Days |
| A32413C100 | 10 | 14 | Delivery 60 Days |
| A31141C100 | 13 | 18 | Delivery 7-10 Days |

FIG. 12

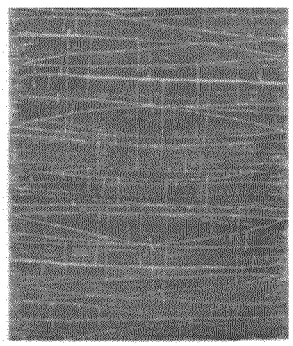

Planke Raindance

FIG. 13

Ordered: 7/25/2012
Confirmed: 7/26/2012
Supplier: Asha Bdr
Loom: 8/15/2012
Finishing: 9/15/2012
Showroom: 10/1/2012
Shipped: 11/30/2012
Weavers
TLC01029
Asha Bdr
moktan
Name: sapana moktan
Age: 25 year old as of 10/1/2012
Gender: female
TLC01035
Asha Bdr
tamang
Name: kumari tamang
Age: 22 year old as of 10/1/2012
Gender: female
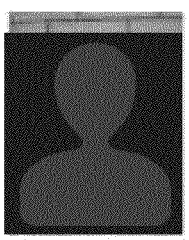
TLC01047
Asha Bdr
tamang
Name: meenu lama
Age: 20 year old as of 10/1/2012
Gender: female
FIG. 14

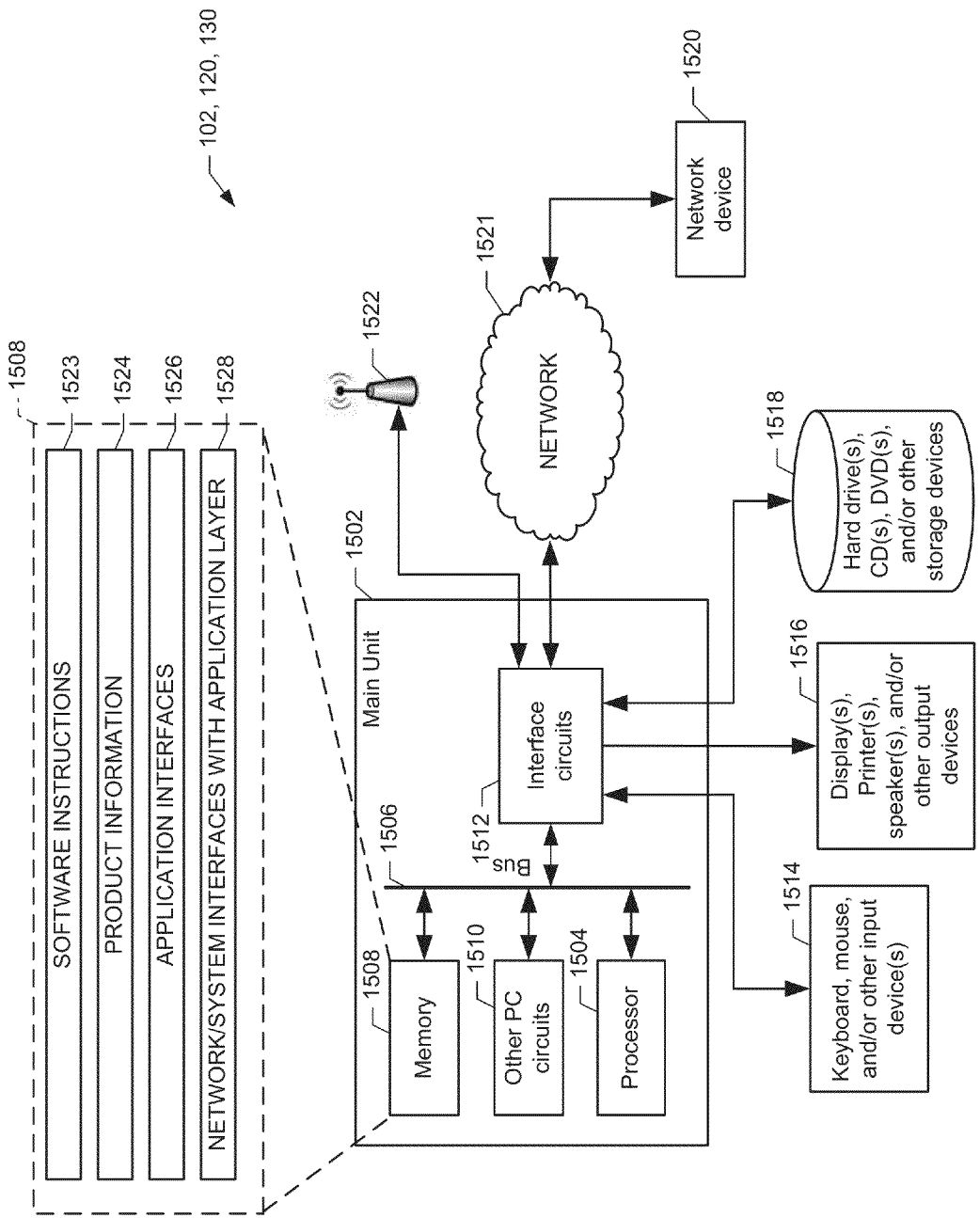

CODE BASED PRODUCT TRACKING METHODS AND APPARATUS

PRIORITY CLAIM

The present application claims priority to and the benefit of U.S. Provisional Patent Application No. 61/834,699, filed on Jun. 13, 2013, the entirety of which is incorporated herein by reference.

BACKGROUND

Most consumer products today, such as woven carpets, are manufactured in developing countries. For a time, consumers were generally content with the imported products (oftentimes being relatively cheap) without much (or any) concern for the people who manufactured the products or their working conditions. At most, people would see the "Made in China", "Made in Nepal", "Made in India", etc. tags or stickers and generally know where the products were made. Social Media and the 24/7 nature of today's news media enables organizations to highlight some of the more dire working conditions and violations of child labor laws associated with the manufacture of consumer products in developing (and sometimes developed) countries. For instance, the United Nations Children's Fund ("UNICEF") attempts to hold factories in countries across the world to the standards ratified in the United Nations Convention on the Rights of the Child. Other more grassroots organizations, such as DoSomething.org, also attempt to highlight and end worldwide inhumane working conditions and violations of child labor laws.

While these organizations attempt to police the manufacturers, there is very little transparency at the consumer or merchant level. Reports or website content may highlight the more extreme violations, however, consumers have almost no visibility into the working conditions associated with the actual products they purchase. Moreover, consumers have no transparency into who is actually making the products they purchase.

In addition to child and workplace safety monitoring, product standard organizations, such as the Tibetan Rug Labor Certification Co. ("TLC"), are tasked with certifying that manufactured products (e.g., woven rugs) comply with material requirements, manufacturing method requirements, chemical requirements, etc. This certification indicates to consumers (and merchants) that the product was made using traditional methods and materials. However, there is very little transparency regarding how and when a product received a certification, whether the certification is genuine, or which organization or specific individual performed the certification.

Moreover, as most consumer products are manufactured outside of the United States, custom inspectors are tasked with ensuring the imported products conform to United States rules/regulations and do not violate intellectual property rights. However, custom inspectors are generally limited to the packaging information included with the product. There is very little transparency regarding when a product entered the United States, whether the product passed inspection, or whether the product even passed legally into the United States through customs. There are also questions regarding whether the packaging information or product documentation provided to customs is even legitimate or accurate.

SUMMARY

The present disclosure provides a new and innovative system, method, and apparatus for using code based product tracking. The example system, method, and apparatus disclosed herein are configured to store to a database product information associated with a product generated during different stages between product manufacture and when the product is available for sale by a merchant. The product information includes, for example, an identity of a company that manufactured the product, an identity of suppliers of raw materials used in the manufacture of the product, identities of workers that created or otherwise were involved in the manufacture of the product, product inspection/certification information, shipping information, customs information, and merchant information.

The example system, method, and apparatus disclosed herein are configured to provide or make available the product information to different entities. For example, an inspector may access the product information to verify the actual product matches the product information and/or conforms to certain guidelines or standards. In another example, a customs agent may access the product information to verify that the actual product being imported matches the stored product information. In yet another example, a consumer may access the product information to learn who made the product they are about to purchase, whether the product passed inspection/certification, and/or whether the product was imported legally.

To enable the product information to be shared, the example system, method, and apparatus disclosed herein use a unique code for each product. In some examples the code may be printed or otherwise included with the product or a product card accompanying the product. A manufacturer, inspector, merchant, or customs agent may provide respective product information or view already stored product information simply by scanning or otherwise accessing the code via a user device, such as a smartphone. The example code may be reproduced in product catalogs or displayed on a webpage enabling consumers to scan or otherwise access the code to easily view the product information.

In an example embodiment, a method includes creating, via a server, in a database a product data structure configured to store product information for a specified product, the product information including manufacturing information and inspection information. The example method also includes creating, via the server, a code and an identifier of the code, storing, via the server, the identifier of the code to the data structure, and receiving, via the server, a message indicative that the code was accessed, the message being generated responsive to a user device accessing the code. The example method further includes determining, via the server, a source entity type that transmitted the message. Conditioned on the source entity type being a manufacturer of the product, the example method stores the manufacturing information to the data structure including an identification of individuals involved in the manufacture of the product. Conditioned on the source entity type being an inspector of the product, the example method transmits the manufacturing information to a user device of the inspector and stores to the data structure the inspection information received from the user device of the inspector. Conditioned on the source entity type being a consumer of the product, the example method determines consumer context information including at least a portion of the manufacturing information and a portion of the inspection information and transmits the consumer context information to a user device of the consumer.

In another example embodiment, an apparatus includes a database including a product data structure configured to store (i) information indicative of a manufacturer of a woven carpet, (ii) information indicative of employees of the manufacturer that produced the woven carpet including a name and an age of each employee, (iii) information indicative of a certification inspection of the woven carpet, and (iv) information indicative of the woven carpet passing through customs. The example apparatus also includes a server communicatively coupled to the database, the server configured to associate a code with the woven carpet and store the information of items (i) to (iv) to the product data structure. The server is also configured to create a consumer context of the information of items (i) to (iv) and make the consumer context of the information of items (i) to (iv) available to a consumer upon receiving a message from a user device of the consumer indicative that the code was accessed by the user device.

Additional features and advantages of the disclosed system, method, and apparatus are described in, and will be apparent from, the following Detailed Description and the Figures.

BRIEF DESCRIPTION OF THE FIGURES

FIG. 3 shows an example data structure created by a management server to store product information, according to an example embodiment of the present disclosure.

FIG. 9 shows a diagram of an example product card including a scannable product code, according to an example embodiment of the present disclosure.

FIG. 12 shows a diagram of inventory product information responsive to a merchant and/or a consumer scanning, recording, accessing, or otherwise reading the product code on the product tag of FIG. 11, according to an example embodiment of the present disclosure.

FIG. 13 shows a diagram of example product information provided to a user device responsive to a consumer and/or a merchant selecting a design name on the inventory product information of FIG. 12, according to an example embodiment of the present disclosure.

FIG. 14 shows a diagram of example manufacturing or production product information for a product provided to a user device responsive to a consumer and/or a merchant selecting a production details link on the inventory product information of FIG. 12, according to an example embodiment of the present disclosure.

FIG. 15 shows a detailed block diagram of an example management server and/or user device, according to an example embodiment of the present disclosure.

DETAILED DESCRIPTION

Figure 1:
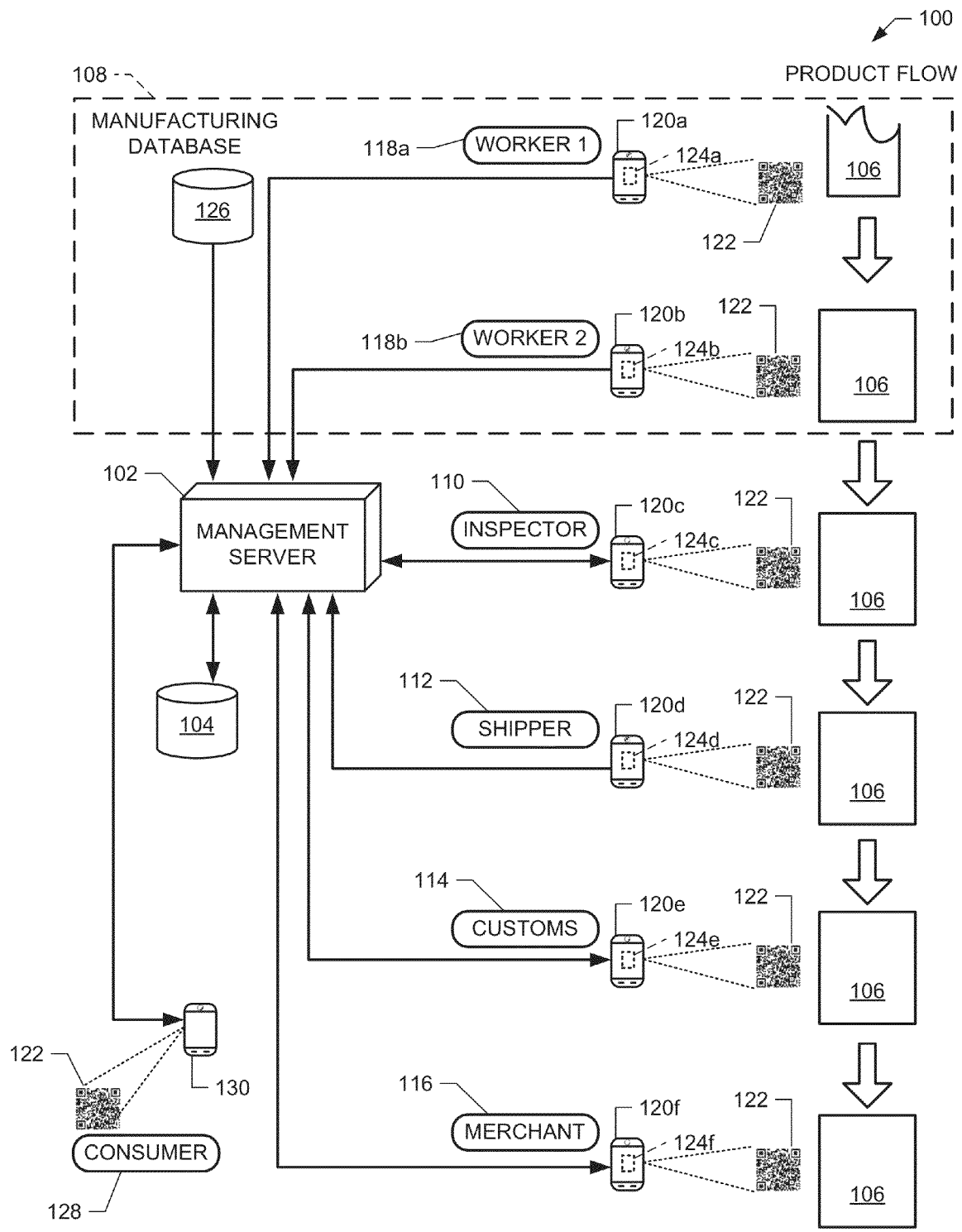
FIG. 1 shows an example product tracking environment, according to an example embodiment of the present disclosure.

The present disclosure relates in general to a method, apparatus, and system for code-based product tracking and, in particular, to a method, apparatus, and system that uses scanable or otherwise accessible codes to store and make available product information to different source entities. The example method, apparatus, and system discussed herein use a management server to manage the storage and access to the product information. The example management server associates a code (e.g., a Quick Response ("QR") code, bar code, etc.) with a product to be manufactured. The example management server may also associate a code with an individual that at least one of manufacturers a product, inspects a product, ships a product, clears a product across a national border, and/or purchases a product.

The example code may be printed on a product card that accompanies the product through the manufacturing and shipping process. Every time the code is scanned, read, or otherwise accessed by a user device, the management server is configured to determine an entity associated with the scan, determine which of the already stored product information is to be transmitted to the user device, and store additional product information transmitted by the user device. In this manner, the example management server uses the unique code to construct and make available a 'story' regarding who, what, when, where, and how a product was manufactured, shipped, and distributed. The 'story' also includes information as to whether the product passed an inspection, was certified to a certain quality or geographic standard, or was imported legally.

The example method, apparatus, and system disclosed herein are accordingly able to solve at least some of the issues identified in the Background section by providing transparency for virtually all stages of a product being manufactured, inspected, shipped, and placed on sale. This transparency is available to entities that have an interest in the product, such as inspectors, customs agents, distributors, and merchants. For instance, merchants may use the example method, apparatus, and system to verify the products they offer for sale are manufactured within the bounds of international agreements and standards, thereby avoiding bad publicity, offended customers, and questions regarding quality, product origination, certification, etc. This transparency is also available to consumers. Moreover, this transparency is available to any organization interested in the preservation of child labor laws, the abolition of inhumane working conditions, and the promotion of a livable wage.

The use of the code by the example method, apparatus, and system disclosed herein enables copies of the same code to track, store, or access product information stored in a database regardless of whether the code is used in a manufacturing location, at customs, or by a consumer. For example, one copy of the code may be included within a product tag in a manufacturing primary location. A second copy of the code may be included with customs documents reviewed by a customs agent. A third copy of the code may be included within a secondary location, such as a printed catalog or a webpage. Regardless of where the code is provided, the use of the same code enables the same product information to be accessed regardless of the entity accessing the information, thereby providing further transparency regarding the product.

The disclosure below makes reference to woven carpet products. However, it should be appreciated that the example methods, apparatus, and system disclosed herein may be used for virtually any type of product. For example, the methods, apparatus, and system may be used for clothing, shoes, textiles, electronics, appliances, automobiles, sporting goods, household goods, etc.

The disclosure below also makes reference to the use of a unique code to track, store, and display product information. A code includes any one-dimensional, two-dimensional, or three-dimensional graphical label that includes information associated with the product to which the code is attached or otherwise associated. A code can include, for example, a QR code or a bar code, that when scanned by a user device, provides a website address or other instruction that enables the user device to access product information. The code may be attached to a portion of the product or may be included within a product card that is attached or otherwise accompanying the product.

The code may also include a wireless chip that is scanable or otherwise readable by a user device. The wireless chip may locally write and/or read the product information. For example, instead of (or in addition to) transmitting product information to the management server, a user device may write the product information to the chip. A downstream entity, such as an inspector or a customs agent may use a user device to read the product information stored on the chip without having to access the management server. In some instances, the product information may only be stored to a database only after being received by, for example, a merchant before the product is offered or available for sale. The wireless chip code may include, for example, a radio frequency identification ("RFID") chip, a near field communication ("NFC") chip, etc.

Reference is also made herein to different context of product information being available to different entities. For instance, the management server may store some sensitive information that may only be available to inspectors, custom agents, or authorized organizations. This sensitive information can include, for example, an address of a worker, a salary of a worker, a name of an inspector or custom agent, manufacturing trade secrets, etc. The example management server accordingly determines which entity is to receive certain contexts of product information and accordingly structures the information appropriate for that entity. The management server may, for example, provide the entire address and salary information of workers to an inspector while showing only a town and salary range (or no salary information at all) to consumers.

Reference is further made herein to product information. As discussed below, product information is information that describes, who, what, when, where, and how a product was manufactured. Product information also describes how a product was processed or propagated through a supply chain and may include inspection information, customs information, shipping information, and merchant information. The product information may also include information regarding raw materials used to manufacture the product in addition to a supplier of the raw materials. The product information may also include consumer information associated with consumers that have viewed an online webpage or catalog offering the product for sale. The consumer information may be used by the management server to, for example, anticipate demand, track consumer interest, determine consumer preferences, etc.

In a specific embodiment, the product is a woven carpet. A printed catalog includes various woven carpets and certain information regarding each carpet. Each displayed carpet model is also associated with a QR code that includes or is otherwise associated with a link to a website that provides product information regarding the manufacture and importation of that carpet model. A consumer uses a scanning device, such as smart phone or tablet computer, to scan the code in the catalog. The website provides real-time information on the available inventory of the model of carpet in addition to specific information including from the quality of the woven carpet, a photograph of the woven carpet during manufacture, and weavers who actually crafted the woven carpet.

The website may also include a link to view information for a specific woven carpet among identical woven carpets of the same model available for sale under the same product name or stock keep unit ("SKU"). For example, one hundred woven rugs may be made under the product name "Twiggs Mint". In some embodiments, a unique code may be generated for each of the hundred rugs. In this instance, a product catalog may include a unique lot code that is associated with each of the generated hundred unique codes. Scanning of the lot code by the user device may display a website that provides in a consumer context a summary of the product information for all of the hundred woven carpets. The management server may also enable a consumer to view the product information for any one of the hundred woven carpets to view product information specific for that carpet. A consumer may also scan at a merchant location a QR code on a product card of one of the woven carpets in the store (or select a code on a website at checkout). Upon scanning the unique code for the specific woven carpet, the management server provides the specific product information for that woven carpet.

Alternatively, one unique code may be generated for all of the hundred woven carpets. In this instance, a product catalog may include the unique code. The management server creates a data structure for all the hundred woven carpet to enable specific information for each woven carpet to be tracked. Scanning of the unique code by the user device may display a website that provides in a consumer context a summary of the product information for all of the hundred woven carpets. The management server may also enable a consumer to view the product information for any one of the hundred woven carpets to view product information specific for that carpet.

FIG. 1 shows an example product tracking environment 100, according to an example embodiment of the present disclosure. The product tracking environment 100 includes a management server 102 communicatively coupled to a database 104. The example management server 102 is configured to manage the creation of product codes, associate the product codes with a specific product (or model of product), collect product information responsive to one or more source entities accessing or scanning the code, and make available different contexts of the product information based on which source entity is requesting the product information. The example database includes a data structure for each generated code. The example data structures are configured to store product information associated with the code including, for example, manufacturing and raw material information, inspection information, shipping information, customs information, merchant information, and/or consumer information.

The illustrated example of FIG. 1 shows a product flow of a product 106 from different source entities including a manufacturer 108, an inspector 110, a shipper 112, customs 114, and a merchant 116. It should be appreciated that other examples could include additional or fewer source entities. For instance, the manufacturer 108 may include more than the two workers 118a and 118b shown. Additionally or alternatively, the product flow may include a distributor, an importer, an exporter, additional merchants (if the product is sold between merchants before being sold to a consumer), and/or consumers (if the product is resold).

In this example each user or individual of the source entities 108 to 116 includes a user device 120. The example user device 120 may include any smartphone, tablet computer, computer, laptop, smart eyewear, smart watch, or application specific device, such as, for example, a specialized manufacturing scanner, a shipping scanner, or a customs scanner. Each of the user devices 120 includes a scanner configured to scan or otherwise read a code. The scanner may include, for example, a camera or laser scanner to read a QR code or bar code, an NFC transceiver to read an NFC chip, an RFID transceiver to read an RFID chip, etc.

It should be appreciated that the management server 102 may also enable certain entities to view the product information simply by providing a product code at a website. For example, the merchant 116 may send the management server 102 the product code to check or track the manufacturing or shipping progress of the product 106. In this manner, the example management server 102 provides enhanced inventory tracking resolved for each individual product.

Storage of Product Information

As mentioned above, the example management server 102 of FIG. 1 is configured to store product information to one or more data structures in the database 104. To enable product information to be stored, the example management server 102 is configured to generate a code 122 specifically for the product 106 (or a model of the product 106). The example code is programmed, encoded, or otherwise includes a website address and/or identifier. In some instances, the code 122 is printed on a portion of the product 106, printed on a product card attached to or otherwise accompanying the product 106, embedded within the product 106 (e.g., an embedded NFC chip), or embedded within a product card.

The user device 120a, responsive to reading or scanning the code 122, is configured to determine the website and/or identifier and access the management server 102 using, in part, the determined website and/or identifier. For example, FIG. 3 shows a data structure 300 created by the management server 102 for the product 106 (e.g., RUG #2390PLEX). In this example, the RUG #2390PLEX may correspond to a SKU or a specific product identifier or design number. The data structure 300 also includes a code identifier (e.g., 12209232). Further, the data structure 300 may be accessible via a website (e.g., www.managementserver.com). The example code 122 may include, for example, the code identifier (e.g., 12209232) and/or the website. The user device 120 uses the website to access the management server 102 via, for example, an IP network (e.g., the Internet) and the code identifier to indicate which code was scanned, thereby indicating which data structure product information is to be stored. In some instances the code identifier may be part of a website address embedded or otherwise included within the code 122.

The example manufacturer 108 receives the code 122, the code identifier, and other product information from the management server 102. In some examples, the management server 102 may determine or receive an order for the product 106 from, for example, the merchant 116. The management server 102 transmits to the manufacturer 108 the parameters for the order including the code 120 (e.g., an electronic version of the code), the code identifier, and the product identifier. The manufacturer 108 may then print the code 120 on a product card when the product 106 begins the manufacturing process and/or program an NFC or RFID chip with the code identifier to create the code 120.

In some embodiments, the example user devices 120 may include an application 124 (e.g., an app) that is specifically configured to accessing a website or file storage service hosted by the management server 102. Each user of the application 124 may register or otherwise program the application 124 with an identifier of the user and/or the source entity. Further, the application 124 may be programmed to automatically access the management server 102 responsive to scanning the code 122. In this manner, the code does not necessarily need to include the website, only the code identifier.

The example management server 102 uses, for example, a source identifier to determine a context of product information for providing to the user device 120, specific prompts for product information based on the source entity, and/or where within the data structure 300 the product information is to be stored. For example, worker 118a uses the user device 120a to scan the code 122 while working on a first phase of the product 106. The application 124a may be programmed or otherwise associated with product information associated with the worker 118 including, for example, a name, an address, an age, a job title, a photo, and a task. This information may be stored at the database 104 when the worker 118a registers the application 124a (or registers with the management server 102 via the application 124a). Alternatively, the product information may be stored locally at the user device 120a and transmitted to the management server 102 responsive to scanning the code 122. The data structure 300 of FIG. 3 shows examples of worker specific product information that may be provided.

In some embodiments, a portion of the product information may be stored at the user device 120a in association with the application 124a and other portions of the product information may be prompted from the user by the application 124a and/or the management server 102 responsive to scanning the code 122. For example, responsive to scanning the code 122, the management server 102 may cause the application 124a to display a prompt asking the worker 118 for a selection or input of a task completed and/or the date/time the task was completed. This additional information could include, for example, a task completed (in cases where a worker may be responsible for performing different tasks), a time/date of the task, etc.

In addition to the worker specific product information, the example management server 102 is also configured to receive product information from the manufacturer 108. For example, the manufacturer 108 may have a manufacturing database 126 configured to store information regarding the manufacture of the product. This product information can include, for example, an identification of raw materials used to manufacture the product 106, an identification of a supplier of the raw materials, an address of the manufacturer 108, a date the product 106 was manufactured, a manufacturing method used to create the product 106, inventory information, prospective shipment date of the product 106, and/or physical characteristics of the product 106. The data structure 300 of FIG. 3 shows example product information that may be provided by the manufacturer 108.

As shown in FIG. 1, the management server 102 is communicatively coupled to the manufacturing database 126. The management server 102 may receive periodic (e.g., hourly, daily, weekly, etc.) transmissions from the manufacturing database 126 that include updates or dynamic product information as the product 106 is being manufactured. Alternatively, the manufacturing database 126 may only provide product information after the product 106 is complete and ready for shipment. For example, an employee may scan the code 122 at the end of the process, which causes the manufacturing database 126 to send the product information (including the code identifier) of the finished product 106 to the management server 102. In yet other examples, the management server 102 may use an application programmable interface ("API") to periodically access and read product information in the manufacturing database 126.

The example management server 102 is also configured to receive inspection or certification product information from the user device 120c. Responsive to scanning the code 122, the user device 120c may transmit to the management server 102 inspection information including, for example, a date the product 106 was inspected, an identifier of the inspector 110, a certification type provided by the inspector 110, and/or a level of quality. FIG. 3 shows example inspection information that may be stored by the management server 102 to the data structure 300.

Figure 2:
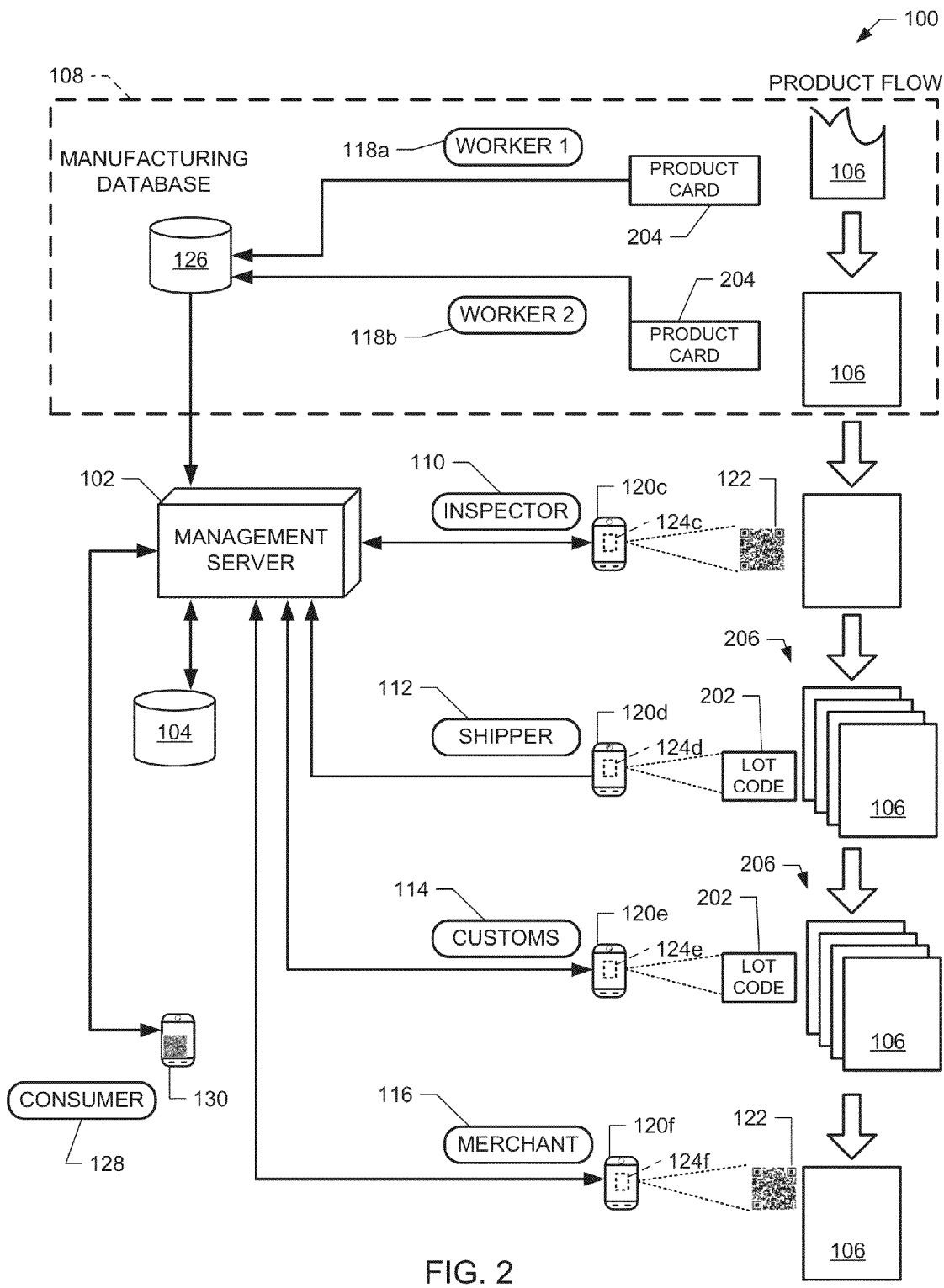
FIG. 2 shows an alternative product tracking environment, according to an example embodiment of the present disclosure.

The management server 102 is further configured to receive shipping information from the shipper 112 and customs information from customs 114. The shipping information may include logistics and other origination/transit/destination information that may be received from, for example, a server managed by the shipper 112. The customs information includes, for example, a time the product 106 passed through customs and an indication the product cleared a customs inspection. Alternatively, the management server 102 may use an API to access the appropriate shipping information and/or customs information from servers managed by the respective entities. In some instances, the manufacturer 108, the shipper 112, and/or customs 114 may associate the code 122 with a lot code 202 in instances the product 106 is shipped within a container or a group of products (as shown in FIG. 2). The management server 102 accordingly updates the data structure 300 based on the shipper 112 and/or customs 114 scanning the lot code 202. The data structure 300 of FIG. 3 shows examples of customs and shipping information.

Regarding specifically customs and homeland security, when those entities inspect a shipment by law it must be labeled with certain required data. The code 122 is attached to a label, which can be scanned by officers or customs agents. Upon scanning the code 122, the management server 102 provides the officers or customs agents access to the stored product information in the data structure 300 information including a serial number (which will match a serial number for that rug or article on a crate packing list), the weavers, country of origin and other product information discussed above. This information could also include a ship date and a vessel on which the rug was transported. Beyond being used for customs compliance, again, the ultimate merchant 116 or inventory manager may access the management server 102 to determine the carpet product 106 is at customs and determine its location in transit, as each time the code 122 is scanned, the location, time and/or individual scanning the code 122 is tracked.

The example management server 102 is also configured to receive merchant information responsive to the merchant 116 scanning the code 122. The merchant information may include a merchant name, date of receipt, sale price, inventory data, resale information, etc. The data structure 300 of FIG. 3 includes examples of shipping information. The merchant 116 or inventory manager uses the product information associated with the code 122 to provide compliance information not only to customs, but to any inspecting or regulatory body at any time. If visited by a regulatory body or inquired by an organization, the merchant 116 or inventory manager could show an investigator each instance the code 122 was scanned for a particular product to show, for example, labor compliance.

The example management server 102 may also store customer information to the data structure 300. For example, the customer 128 may user the user device 130 to scan the code 122 by, for example, scanning the code 122 on a product card or product tag (e.g., the product tag 1100 of FIG. 11) while viewing the product in a store. The consumer 128 may also use the user device 130 to scan the code 122 printed in a catalog or displayed in an advertisement or poster. The consumer 128 may further use the user device 130 to scan the code 122 displayed on a television or displayed within a website. Alternatively, the consumer 128 may select the code 122 (or a hyperlink including the code identifier and/or the website of the management server 102) displayed on a webpage. Responsive to scanning the code 122, the user device 130 accesses a website managed by the management server 102 (or a website operated by a merchant that uses a server with an API to access the product information from the management server 102). While the consumer 128 is primarily concerned with viewing product information, the scanning or selection of the code 122 causes the management server 102 to determine or receive information associated with the consumer 128. This information can include for example, an IP or hardware address of the user device 130, a time/day the code 122 was scanned, a source of the scan (e.g., tag, webpage, poster, television advertisement, etc.), and/or any demographic information associated with the consumer 128. The example management server 102 stores the consumer information to, for example, the data structure 300 to enable the merchant 116 to determine whether the product 106 is popular and accordingly adjust product manufacturing based on demand.

The management server 102 may also store a rating provided by the consumer to the product 106 generally and/or to any one of the workers 118, for example, based on a review of craftsmanship. This feedback may be provided to the workers 118 to encourage high quality work or provide job satisfaction knowing their hard work was well received by the consumer. The manufacturer 108 may also use the feedback from the consumers 128 to identify certain workers 118 for awards or promotion based on positive reviews.

It should be appreciated that the user device 130 of the consumer 128 does not include the application 124. In these embodiments, the management server 102 may determine a source entity type of the consumer 128 by determining that a source entity identifier has not been received responsive to scanning the code 122. In other words, the management server 102 may default to the source entity being the consumer 128 if a source entity identifier (or any other identifier) is not received in conjunction with the user device 120 and 130 scanning the code 122.

As discussed above, the management server 102 is configured to determine which of the source entities 108 to 116 and 128 has scanned the code 122. In some instances, as discussed, the application 124 may transmit in a message, generated responsive to scanning the code 122, an identifier of the source entity. Alternatively, the management server 102 may use an Internet Protocol ("IP") address or other identifier associated with the user device 120 to determine the source entity. For instance, responsive to determining that an IP address is associated with Tibet, the management server 102 determines the source entity is the manufacturer 108 and/or the workers 118.

The management server 102 may also determine the source entity based on the product information received. For example, product information that includes names, ages, and tasks may be determined by the management server 102 as product information from the workers 118 and accordingly stored to the appropriate section of the data structure 300. In another example, product information indicative of customs information is determined by the management server 102 as product information from the customs agent 114.

In yet other examples, the management server 102 and/or the application 124 may prompt a user for a source entity identifier responsive to scanning the code 122. For instance, after scanning the code 122, the user device 120c may display a website hosted or operated by the management server 102 that prompts the user to indicate if the user is associated with the manufacturer 108, the inspection agency 110, the shipping company 112, customs 114, or the merchant 116. Responsive to, for example, the customs agent 114 selecting customs, the management server 102 may accept or otherwise receive the product information from the user device 120c. In some instances, the user may also have to be authenticated or provide a password.

Figure 10:
FIG. 10 shows a diagram of an example personal identifier card including a scannable personal code, according to an example embodiment of the present disclosure.

Alternatively, a source entity may provide a source entity identifier by scanning a personal code with their user device 122. For instance, each of the workers 118 may have a personal identifier card 1000, as shown in FIG. 10. The personal identifier card 1000 may be provided by an organization (e.g., the Tibetan Rug Labor Certification Co) and includes, for example, a profile picture, a name, an age, a gender, a profession, and an employer/importer. The personal identifier card 1000 also includes a personal code 1002 that includes, for example, an identifier of the worker 118, a source entity identifier, and/or a link to a website or database that includes worker information. It should also be appreciated that the inspector 110, shipper 112, customers 114, and/or the merchant 116 may also be assigned unique codes.

In an example, the worker 118a may scan the personal code 1002 in conjunction with scanning the code 122 of the product 106 to accordingly provide manufacturing product information and/or a source entity identifier. In some embodiments, scanning the personal code 1002 may cause the application 124a to access the manufacturing database 126 to retrieve information associated with the worker 118a, which is then transmitted to the management server 102 in conjunction with an identifier of the scanned product code 122. In other embodiments, scanning the personal code 1002 may cause the application 124 to determine worker information and/or a source entity identifier embedded or otherwise included within the personal code 1002. The application 124 transmits this worker information to the management server 102 to track which workers were involved in the manufacture of a model of a product or a specific product. In instances where the personal code 1002 only includes a source entity identifier and/or an identifier of the worker 118, the example application 124 transmits this information to the management server 102. The example management server 102 may then use the identifier to retrieve locally stored worker information (provided form the manufacturer 108 or by the worker during registration) and/or retrieve the worker information from the manufacturing database 126.

It should be appreciated that the inspector 110 may scan the personal code 1002 to verify the identity of the worker 118a and/or verify that the worker 118a did in fact contribute the manufacture of the product 106. For instance, responsive to receiving an indication that the user device 120c of the inspector 110 scanned the personal code 1002, the example management server 102 (and/or the manufacturing database 126) provides the worker information to the inspector 110 including worker product information stored to the data structure 300 of the product 106. The management server 102 may also store in conjunction with the inspection product information that the identifier of the worker was verified by an inspector.

In some instances, the code 122 may include a wireless chip. In these instances, the product information may be stored locally to the wireless chip in addition to or alternative from storing the product information at the management server 102. In these instances, the product information is locally stored, which may later be accessed by any of the user devices 120 that read or access the code 122. Such a configuration enables transparency of product manufacturing, certification, shipping, and customs when access to the management server 102 is not available and/or not preferred.

FIG. 2 shows an alternative example where the lot code 202 and a product card 204 may replace the code 122 during portions of the product flow. In this embodiment, the workers 118 may provide their information on the product card 204, which is then entered into the manufacturing database 126. Alternatively, a manager or operator at the manufacturer 108 may enter which of the workers 118 performed which tacks on which of the products and enter this information into the database 126. In this manner, the manufacturing information is still recorded despite the workers 118 not having access to a device to scan the code 122.

Alternatively, the code 122 may be provided on the product card 204. FIG. 9 shows an example product card 204 that includes the code 122. The workers 118 may provide information on the product card 204 and scan the code 122 to provide the management server 102 an indication where the product 106 is during the manufacturing process. The information provided on the product card 204 may later be transmitted to the management server 102 by a transcriber during and/or after the product 106 is manufactured. Alternatively, the product card 204 may be scanned and transmitted to the management server 102, which uses text recognition to determine the product information. The management server 102 may also read the code 122 to determine which product 106 is associated with the scanned product card 204.

Additionally, since the product 106 may be shipped with a group of products 206, the code 122 may be associated with the lot code 202. Any change to product information based on scanning the lot code 202 is caused by the management server 102 to be reflected with each of the codes 122 of all the products 106 within the same lot. In this manner, shipping and customs information may still be recorded despite a shipper or customs agent not individually scanning each code 122.

Display of Product Information

In addition to storing and managing product information, the example management server 102 of FIG. 1 is also configured to make product information available for display to different source entities. In some embodiments, the management server 102 may make available all the product information in the data structure 300 to any of the user devices 120 and 130 that scan the code 122. In these embodiments, the product information stored at the data structure 300 of FIG. 3 may be more limited so as no not disclose sensitive or confidential information.

Alternatively, the management server 102 may be configured to determine a context of the product information to be made available to the user device 120 and 130 based, for example, on a source entity type requesting the product information. For example, responsive to determining that the source entity type includes the inspector 110, the management server 102 determines an inspector context of the product information. The inspector context may include almost all of the product information associated with manufacturing.

Figure 4:
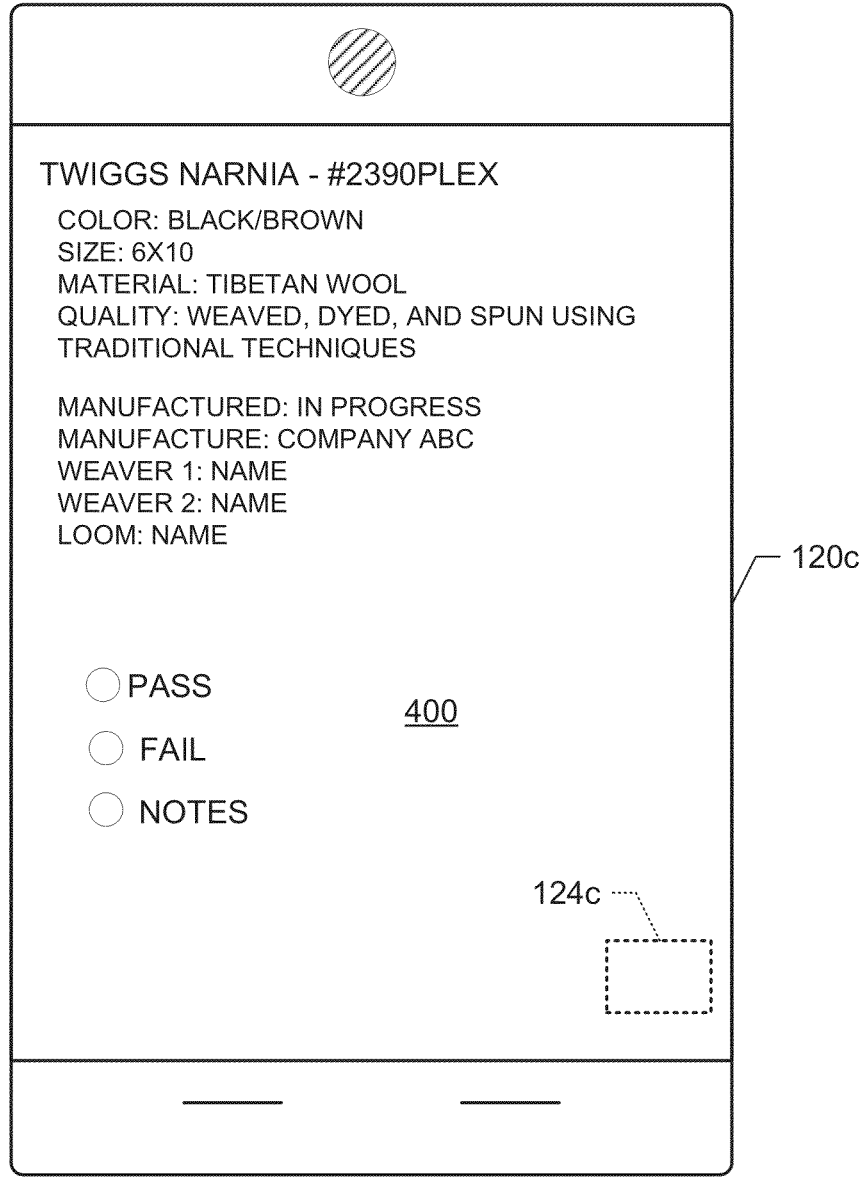
FIG. 4 shows a user device displaying inspector context product information, according to an example embodiment of the present disclosure.

FIG. 4, for example, shows the user device 120c displaying inspector context product information 400. The display of the inspector context product information 400 enables the inspector 110 to verify the product 106 is made from the indicated raw materials, was made according to specified manufacturing methods, and adheres to a certain level of quality. Further the inspector 110 can verify the workers 118 are above a specified age limit and are paid an acceptable wage. After inspecting the product 106, the inspector 110 may enter a result (e.g., pass, fail, notes) prompted via the user device 120c shown in FIG. 4. The application 124c transmits the entered results of the inspection to the management server 102 as inspection product information.

When, for example, a woven carpet product 106 is at a loom, the inspector 110 scans the code 122 (and/or the personal code 1002) to view the weavers that should be weaving the rug. Scanning the code 122 also sends inspection product information to the management server 102 providing a verification to the merchant 116 and/or the consumer 128 that that the inspector 110 actually inspected the rug. This inspection product information cannot be manipulated since only one code 122 is assigned to the product 106 and/or product card and that product card (e.g., the product card 204 of FIG. 9) follows the woven carpet product 106.

In contrast to the inspector information context 400, the management server 102 determines a customer context of product information responsive to determining that the customer 128 scanned the code 122. The customer context may include more general worker information, such as a picture, name, age, and town. This customer context product information may also include a more general listing of the raw materials and manufacturing methods. Further, the customer context product information may include a summary of the inspection/certification and an indication the product 106 passed legally through customs.

Woven Carpet Embodiment

Figure 5:
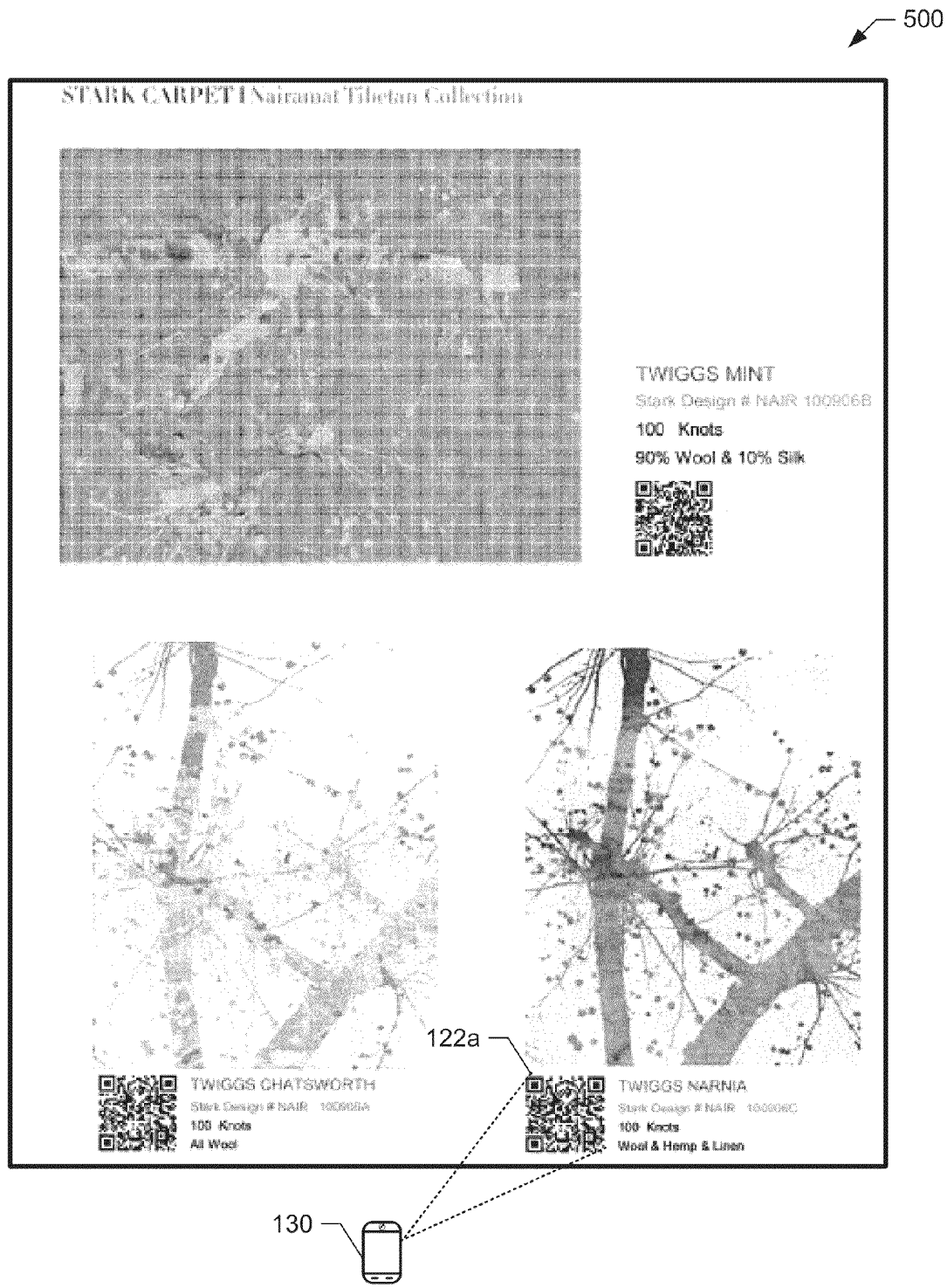
FIG. 5 shows an example of a user device of a consumer recording a picture of a code in a catalog, according to an example embodiment of the present disclosure.

FIG. 5 shows an example of the user device 130 of the consumer 128 recording a picture of the code 122a of FIG. 1. In this example the code 122 is a QR code that is printed in a catalog 500 that provides information about woven carpets available for sale. The consumer 128 uses the user device 130 to scan or otherwise record the code 122a. The user device 130 determines, for example, a website and/or product code included within the code 122a. Accordingly, the user device 130 navigates to the website to display product information corresponding to the scanned or recorded code 122a.

It should be appreciated in some examples the code 122a may be different from the code 122 used during the product flow. For example, the code 122a may go to a website of the merchant 116 that enables the consumer 106 to purchase the product online. Additionally, the website of the merchant 116 may display product information stored in the database 104 to make it appear the merchant is the entity responsible for managing the product information. In some instances, the merchant 116 may specify which of the product information is displayed and how it is displayed within the merchant's website. In other instances, the scanning of the code 122a causes the user device 130 to go to a website hosted or operated by the management server 102 to view the product information.

As mentioned above, in other examples, the catalog 500 may include an online catalog. In these examples, consumer 128 may use a pointer to select the code 122a or other hyperlink. The consumer 128 may also use the user device 130 to scan the code 122 displayed by another device on the webpage. Selection of the code 122a causes the user device 130 to navigate to the appropriate webpage.

Figure 6:
FIG. 6 shows an example of customer context product information provided by a management server responsive to a user device scanning or recording a code, according to an example embodiment of the present disclosure.

FIG. 6 shows an example of customer context product information 600 provided by the management server 102 responsive to the user device 130 scanning or recording the code 122a. In this example, the management server 102 receives a message from the user device 130 responsive to scanning the code 122a. The management server 102 determines that the source entity type is a customer by determining the message does not include a source entity identifier. The management server 102 accordingly determines customer context product information 600 for display, including, product characteristics, manufacturing information, inspection information, customs information, merchant information, and shipping information. The product information may also include the code identifier and/or a SKU of the product.

Figure 7:
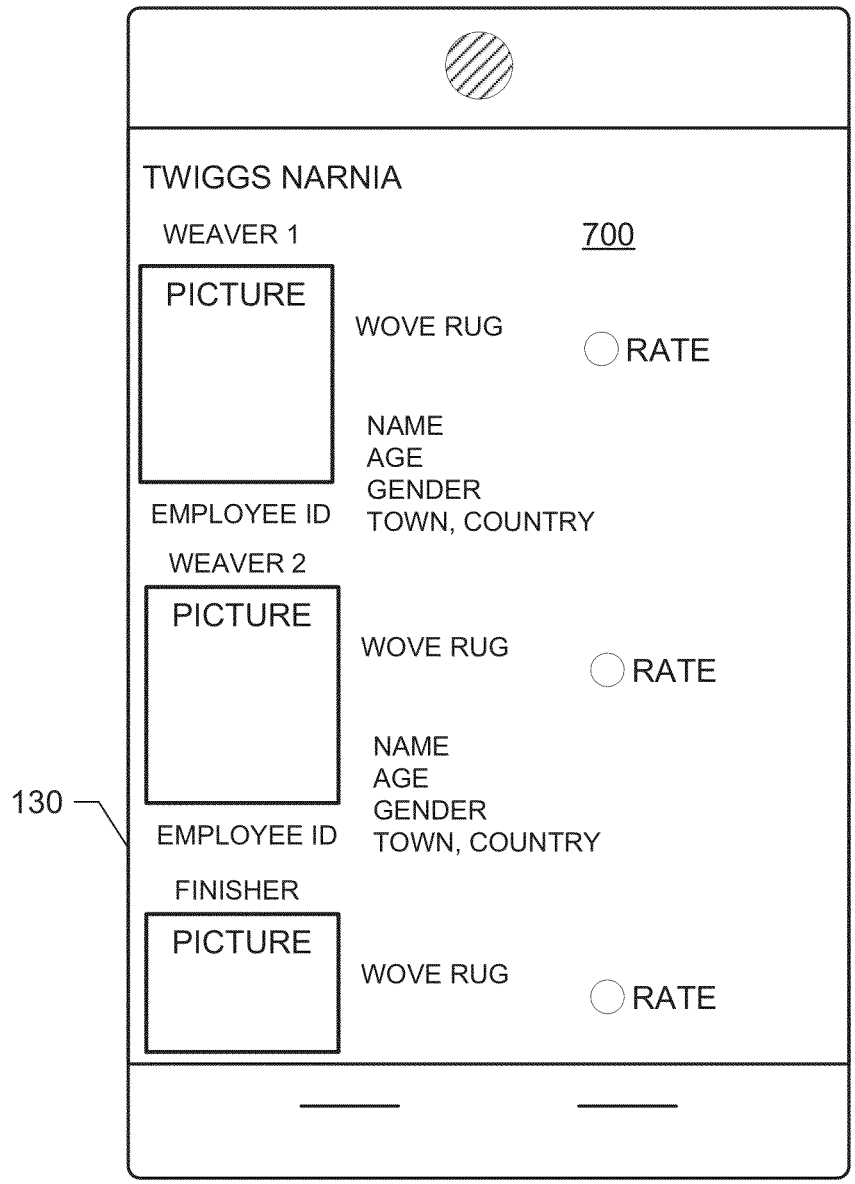
FIG. 7 shows example manufacturing product information including information regarding the workers that manufactured a product, according to an example embodiment of the present disclosure.

A user may select the manufacturing information to view additional information regarding the individuals that manufactured the product 106. For instance, FIG. 7 shows manufacturing product information 700 including information regarding the workers that manufactured the product 106. This information includes, for example, a picture of the worker, a name, age, and town of the worker, and a task completed by the worker. The management server 102 may also include prompts for the consumer to rate the product.

The consumer 128 may purchase the woven carpet product 106 and subsequently register with the management server 102. Registration may enable the consumer 128 to view additional product information that was not included with the customer context product information 600 such as, for example, more detailed manufacturing information. Registration may also help the management server 102 maintain a full set of data regarding the product 106 in the event the owner consumer 128 wishes to resell the product 106 and/or the product 106 is recalled, or if subsequent purchasers want to obtain more information regarding the product 106. In other examples, purchase of the product 106 causes the management server 102 to disable access to the corresponding product information.

Flowchart of the Example Process

Figure 8:
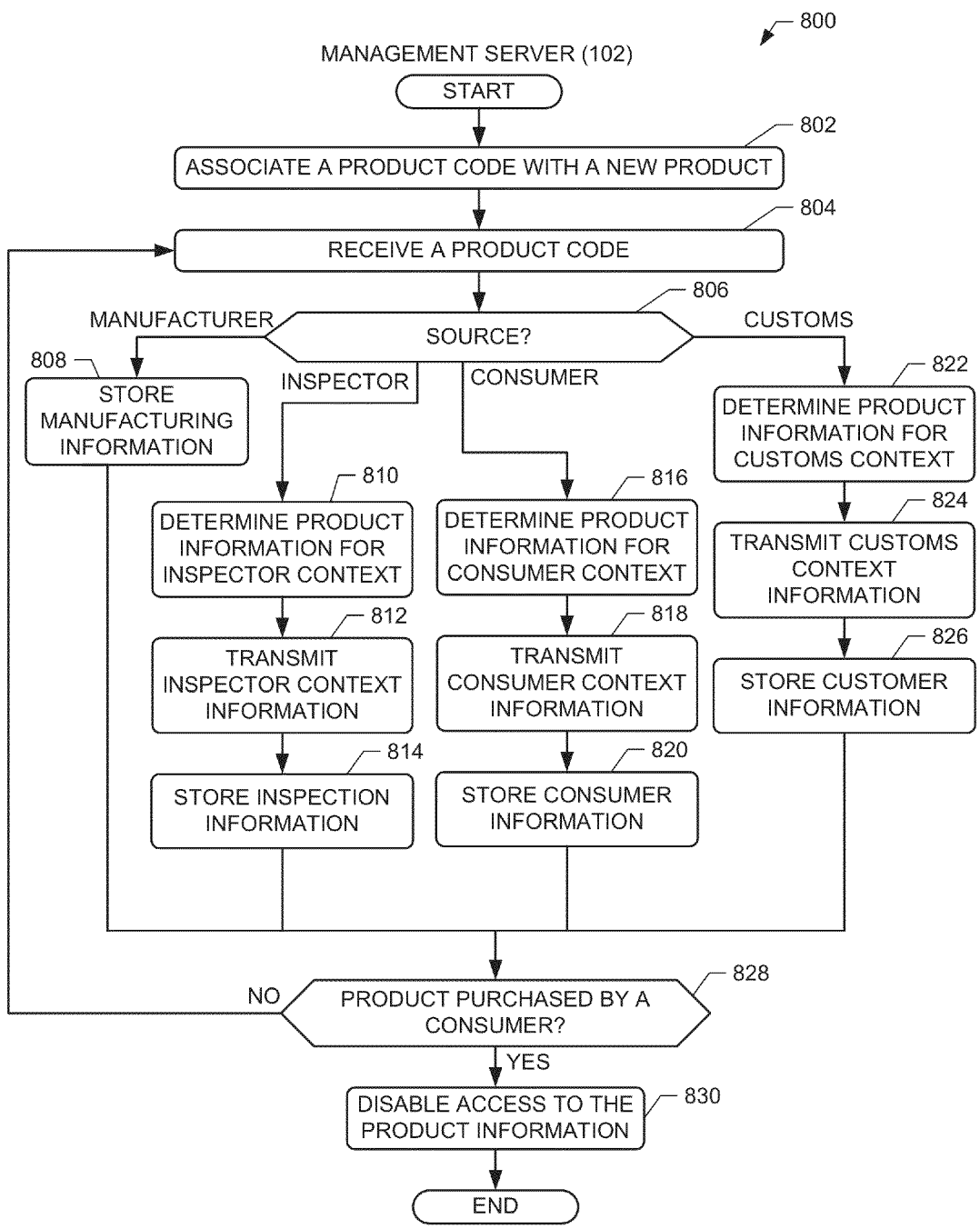
FIG. 8 illustrates a flow diagram showing an example procedure to store, track and provide product information using a code, according to an example embodiment of the present disclosure.

FIG. 8 illustrates a flow diagram showing an example procedure 800 to store, track, and display product information for a specific product, according to an example embodiment of the present disclosure. Although the procedure 800 is described with reference to the flow diagram illustrated in FIG. 8, it should be appreciated that many other methods of performing the steps associated with the procedure 800 may be used. For example, the order of many of the blocks may be changed, certain blocks may be combined with other blocks, and many of the blocks described are optional. Further, the actions described in procedure 800 may be performed among multiple devices including, for example the management server 102 and/or the user devices 120 and 130.

The example procedure 800 of FIG. 8 operates on, for example, the management server 102 of FIGS. 1 and 2. The procedure 800 begins when the management server 102 creates a new code and associates the code with a product to be manufactured (block 802). The example management server 102 some time later receives a message indicative that the product code was scanned or otherwise accessed by a user device (block 804). The example management server 102 then determines a source entity of the received message (block 806).

Conditioned on detecting that the source entity was from a manufacturer, the example management server 102 stores the manufacturing information in a data structure corresponding to the product (block 808). In other examples, the management server 102 may periodically read the manufacturing product information from a database or server operated by the manufacturer. Conditioned on detecting that the source entity was from an inspector (e.g., receiving a source identifier within the received message corresponding to an inspector), the management server 102 determines product information for a inspector context (block 810). The management server 102 also transmits the inspector context product information (block 812) and stores to the data structure any received inspection product information (block 814).

Conditioned on detecting that the source entity was from a consumer (e.g., not detecting a source identifier within the received message), the management server 102 determines product information for a consumer context (block 816). The management server 102 next transmits the consumer context product information (block 818) and stores to the data structure any received consumer product information (block 820). Conditioned on detecting that the source entity was from customs (e.g., receiving a source identifier within the received message corresponding to a customs agent), the management server 102 determines product information for the customs context (block 822). The management server 102 transmits the customs context product information (block 824) and stores to the data structure any received customs product information (block 826). The management server 102 may also perform similar source entity checks (and provide context-based product information/receive product information) for merchants, shippers, importers, exporters, humanitarian organizations, distributors, etc.

After storing the product information, the example management server 102 may determine whether the product was purchased (block 828). If the product was not purchased, the example management server 102 waits until another code is scanned or otherwise accessed. The example management server 102 may also provide access to the stored product information to authorized entities that have, for example, the code identifier or a product identifier. If the product was purchased, the example management server 102 may disable access to the product information (block 830). The example procedure 800 then ends. Alternatively, the example procedure 800 may record the purchase of the product at the management server 102 to provide product history transparency to subsequent purchases.

Inventory Embodiment

The example management server 102 of FIGS. 1 and 2 may be configured to track inventory for one or more models of products. The inventory information may be useful to merchants by providing a description of how much of a particular product model or design is in stock including an amount of the product in different colors, sizes, configurations, etc. A merchant may use this information for restocking purposes. The inventory information may also be useful to consumers by showing remaining quantities of a particular product.

Figure 11:
FIG. 11 shows a diagram of an example product tag including a scannable product code, according to an example embodiment of the present disclosure.

In an example embodiment, a merchant and/or consumer may scan the code 122 on the product tag 1100 of FIG. 11 with the user device 120 and/or 130. For instance, a merchant may have a plurality of product tags on a computer screen that correspond to models of products being managed by the merchant. The merchant may scan the code 122 to accordingly view inventory for that particular model of product. In another instance, the product tag 1100 may be included within a catalog or on the product itself. A consumer uses the user device 130 to scan the code 122 to view available inventory for the product and corresponding product information.

FIG. 12 shows a diagram of inventory product information 1200 provided by the management server 102 responsive to the merchant and/or consumer scanning, recording, accessing, or otherwise reading the code 122 on the product tag 1100 of FIG. 11. The inventory product information 1200 includes product information associated with products of the same model scanned by the consumer and/or the merchant. For instance, the product information includes information specific for the product scanned by the consumer and/or merchant (e.g., carpet #, size, knots, quality) in addition to a list of other products of the same model or design. For instance, woven rugs may be made in different sizes for the same design. The inventory information includes a product identifier of the other available products of the same design including product characteristics (e.g., width and length) and an estimated delivery date. The consumer and/or merchant may view information specific for each product within the inventory list by selecting a product number (e.g., A25453C100). Such information enables a consumer and/or merchant to view other products of the same design for purchasing or inventory management.

The consumer and/or merchant may view additional product information regarding the specifically scanned product by selecting a model or design name (i.e., Planke Raindance). FIG. 13 shows a diagram of an example of product information provided by the management server 102 responsive to the consumer and/or the merchant selecting the design name in FIG. 12. In this embodiment, the product information of FIG. 13 includes a picture of the pattern of the product or a picture of the product during manufacture.

The consumer and/or merchant may further view product information associated with the product by selecting a link to the production details. FIG. 14 shows a diagram of example manufacturing or production product information for the product provided by the management server 102 responsive to receiving a selection of the 'Production Details' link on FIG. 12. This product information includes a date the product was ordered, a date the order was confirmed, a supplier (or manufacturer) or the product, a date the product left a loom at the manufacturer, a date the product went through a finishing process at the manufacturer, a date the product was placed in a showroom of a merchant, and a date the product was shipped to a consumer. The product information also includes worker product information including a picture, identifier, name, employer, age, profession, and gender of the workers. The product information may also include inspection and customs information. Such information provides a 'story' of the product, which the merchant and/or consumer may view to obtain a better understanding regarding the people and the process that created the product. Such transparency should hopefully provide more attention to and improve working conditions and end illegal child labor.

Processor

A detailed block diagram of electrical systems of an example computing device (e.g., management server 102 and/or the user devices 120 and 130), is illustrated in FIG. 15.

In this example, the devices 102, 120, and 130 include a main unit 1502 which preferably includes one or more processors 1504 communicatively coupled by an address/data bus 1506 to one or more memory devices 1508, other computer circuitry 1510, and one or more interface circuits 1512. The processor 1504 may be any suitable processor, such as a microprocessor from the INTEL PENTIUM® or CORE™ family of microprocessors. The memory 1508 preferably includes volatile memory and non-volatile memory. Preferably, the memory 1508 stores a software program that interacts with the other devices in the environment 100, as described above. This program may be executed by the processor 1504 in any suitable manner. In an example embodiment, memory 1508 may be part of a "cloud" such that cloud computing may be utilized by devices 102, 120, and 130. The memory 1508 may also store digital data indicative of product information, etc. retrieved from (or loaded via) devices 102, 120, and 130.

The example memory devices 1508 store software instructions 1523, product information 1524, user interface features 1526, permissions, protocols, identification codes, product identifiers, content information, registration information, code identifiers, and/or configurations. The memory devices 1508 also may store network or system interface features, permissions, protocols, configuration, and/or preference information 1528 for use by the devices 102, 120, and 130. It will be appreciated that many other data fields and records may be stored in the memory device 1508 to facilitate implementation of the methods and apparatus disclosed herein. In addition, it will be appreciated that any type of suitable data structure (e.g., a flat file data structure, a relational database, a tree data structure, etc.) may be used to facilitate implementation of the methods and apparatus disclosed herein. For example, the data structure 300 of FIG. 3 may be flat or hierarchical.

The interface circuit 1512 may be implemented using any suitable interface standard, such as an Ethernet interface and/or a Universal Serial Bus (USB) interface. One or more input devices 1514 may be connected to the interface circuit 1512 for entering data and commands into the main unit 1502. For example, the input device 1514 may be a keyboard, mouse, touch screen, track pad, track ball, isopoint, image sensor, character recognition, barcode scanner, microphone, and/or a speech or voice recognition system.

One or more displays, printers, speakers, and/or other output devices 1516 may also be connected to the main unit 1502 via the interface circuit 1512. The display may be a cathode ray tube (CRTs), a liquid crystal display (LCD), or any other type of display. The display generates visual displays generated during operation of the device 102, 120, and 130. For example, the display may provide a user interface and may display one or more webpages received from the device 102, 120, and 130. A user interface may include prompts for human input from a user of the devices 102, 120, and 130 including links, buttons, tabs, checkboxes, thumbnails, text fields, drop down boxes, etc., and may provide various outputs in response to the user inputs, such as text, still images, videos, audio, and animations.

One or more storage devices 1518 may also be connected to the main unit 1502 via the interface circuit 1512. For example, a hard drive, CD drive, DVD drive, and/or other storage devices may be connected to the main unit 1502. The storage devices 1518 may store any type of data, such as product information, user interface features, permissions, protocols, identification codes, product identifiers, content information, registration information, code identifiers, configurations, or usage data, statistical data, security data, etc., which may be used by the devices 102, 120, and 130.

The computing devices 102, 120, and 130 may also exchange data with other network devices 1520 via a connection to a network 1521 (e.g., the Internet) or a wireless transceiver 1522 connected to the network 1521. Network devices 1520 may include one or more servers, which may be used to store certain types of data, and particularly large volumes of data which may be stored in one or more data repository. A server may process or manage any kind of data including databases, programs, files, libraries, identifiers, identification codes, registration information, content information, product information, manufacturing information, media content, image data, video data, audio data, usage data, statistical data, security data, etc. A server may store and operate various applications relating to receiving, transmitting, processing, and storing the large volumes of data. It should be appreciated that various configurations of one or more servers may be used to support, maintain, or implement the devices 102, 120, and 130 of the environment 100. For example, servers may be operated by various different entities, including operators of the management server 102. Also, certain data may be stored in and/or by one of the devices 102, 120, and 130 which is also stored on a server, either temporarily or permanently, for example in memory 1508 or storage device 1518. The network connection may be any type of network connection, such as an Ethernet connection, digital subscriber line (DSL), telephone line, coaxial cable, wireless connection, etc.

Access to the devices 102, 120, and 130 can be controlled by appropriate security software or security measures. An individual third-party client or consumer's access can be defined by the device 102, 120, and 130 and limited to certain data and/or actions. Accordingly, users of the environment 100 may be required to register with one or more computing devices 102, 120, and 130.

CONCLUSION

It will be appreciated that all of the disclosed methods and procedures described herein can be implemented using one or more computer programs or components. These components may be provided as a series of computer instructions on any computer-readable medium, including RAM, ROM, flash memory, magnetic or optical disks, optical memory, or other storage media. The instructions may be configured to be executed by a processor, which when executing the series of computer instructions performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method for tracking production of a rug comprising:
creating, via a server, in a database a product data structure configured to store product information for the rug, the product information including manufacturing information of the rug and inspection information of the rug;
creating, via the server, a code and an identifier of the code;
storing, via the server, the identifier of the code to the data structure;

19 receiving, via the server, a message indicative that the code was accessed, the message being generated responsive to a user device accessing the code and including the identifier of the code;

determining, via the server, a source entity type that transmitted the message;

conditioned on the source entity type being a manufacturer of the rug, storing the manufacturing information to the data structure including an identification of individuals involved in the manufacture of the rug;

conditioned on the source entity type being an inspector of the rug:
- transmitting, via the server, the manufacturing information to a user device of the inspector, and
- storing to the data structure via the server the inspection information of the rug received from the user device of the inspector; and conditioned on the source entity type being a consumer of the rug:
- determining consumer context information including at least a portion of the manufacturing information of the rug and a portion of the inspection information of the rug, and
- transmitting, via the server, the consumer context information to a user device of the consumer.

2. The method of claim 1, further comprising, storing to the data structure via the server consumer information received from the user device of the consumer.

3. The method of claim 2, wherein the consumer information includes at least one of a rating of the product, an identifier of the consumer, an Internet Protocol address associated with the user device of the consumer and a time the consumer transmitted the message.

4. The method of claim 1, further comprising, conditioned on the source entity type being customs agent:
- transmitting the manufacturing information to a user device of the customs agent; and
- storing to the data structure via the server customs information received from the user device of the customs agent.

5. The method of claim 1, further comprising, conditioned on the source entity type being a merchant:
- transmitting the manufacturing information to a user device of the merchant; and
- storing to the data structure via the server merchant information received from the user device of the merchant.

6. The method of claim 1, wherein determining that the source entity type corresponds to a consumer includes determining the source entity is not the manufacturer and is not the inspector.

7. The method of claim 1, wherein determining the source entity type includes prompting a user of the user device via the server to provide the source entity type after receiving the message indicative that the code was accessed.

8. The method of claim 1, wherein determining the source entity type includes:
- determining an Internet Protocol address of the user device;
- determining a geographic location associated with the Internet Protocol address; and
- determining the source entity type based on the geographic location.

9. The method of claim 1, wherein the code is included on a product tag of the rug and includes at least one of a Quick Response ("QR") code, a bar code, a radio frequency identification ("RFID") chip, and a near field communication ("NFC") chip.

20

10. A machine-accessible device having instructions stored thereon that are configured, when executed, to cause a machine to at least:

transmit an order to a manufacturer to manufacture a carpet, the order including a scanable code configured to be included on a product card of the carpet, the scanable code having an identifier;

create in a database a product data structure configured to store product information for the carpet associated with the scanable code, the product information including manufacturing information related to the carpet, inspection information related to the carpet, and customs information related to the carpet;

store the manufacturing information to the product data structure responsive to receiving a manufacturer message from the manufacturer generated by a manufacturer user device scanning the scanable code, the message including the manufacturing information of the product and the identifier of the scanable code;

store the inspection information to the product data structure responsive to receiving an inspection message from an inspector generated by an inspector user device scanning the scanable code, the message including the inspection information of the product and the identifier of the scanable code;

store the customs information to the product data structure responsive to receiving a customs message from a customs agent generated by a customs user device scanning the scanable code, the message including the customs information of the product and the identifier of the scanable code;

cause the scanable code to be provided within a catalog;

receive a consumer message to access the product information, the consumer message being generated from a consumer user device scanning the scanable code in the catalog; and transmit at least a portion of the product information related to the carpet to the consumer user device.

11. The machine-accessible device of claim 10, wherein the catalog is an online catalog and the scanable code includes a hyperlink to the product information.

12. The machine-accessible device of claim 10, wherein the catalog is a paper catalog and the scanable code includes a hyperlink to the product information.

13. The machine-accessible device of claim 10, wherein the inspection information includes at least one of a date the carpet was inspected, an identifier of the inspector, a certification type provided by the inspector, and a level of quality.

14. The machine-accessible device of claim 10, wherein the manufacturing information includes at least one of an identification of raw materials used to manufacture the carpet, an identification of a supplier of the raw materials, an address of the manufacturer, a date the carpet was manufactured, a manufacturing method used to create the carpet, and physical characteristics of the carpet.

15. The machine-accessible device of claim 10, wherein the customs information includes a time the carpet went through customs and an indication the carpet passed a customs inspection.

16. An apparatus for tracking production of a woven carpet, comprising
- a database including a product data structure configured to store (i) information indicative of a manufacturer of the woven carpet, (ii) information indicative of employees of the manufacturer that produced the woven carpet including a name and an age of each employee, (iii) information indicative of a certification inspection of the woven carpet, and (iv) information indicative of the woven carpet passing through customs;

a server communicatively coupled to the database, the server configured to:

associate a code with the woven carpet and the product data structure;

receive items (i) and (ii) in conjunction with a first message including the code scanned by a first device of the manufacturer of the woven carpet;

receive item (iii) in conjunction with a second message including the code scanned by a second device of an inspector of the woven carpet;

receive item (iv) in conjunction with a third message including the code scanned by a third device of a customs agent;

determine items (i) to (iv) are to be stored to the product data structure based on the code received in conjunction with each of items (i) to (iv);

store the information of items (i) to (iv) to the product data structure;

create a consumer context of the information of items (i) to (iv); and make the consumer context of the information of items (i) to (iv) available to a consumer upon receiving a message from a user device of the consumer indicative that the code was accessed by the user device.

17. The apparatus of claim 16, wherein the server is configured to provide transparency to the consumer regarding the manufacture of the woven carpet via the information of items (i) to (iv).

18. The apparatus of claim 16, wherein the server is configured to receive the information of items (i) to (iv) responsive to at least one of the manufacturer, the employees, the inspector, and the customs agent accessing the code.

19. The apparatus of claim 18, wherein the server is configured to transmit the information of items (i) and (ii) to a user device of the inspector responsive to the user device of the inspector scanning the code.

20. The apparatus of claim 18, wherein the server is configured to transmit the information of items (i) and (iii) to a user device of the customs agent responsive to the user device of the customs agent scanning the code.

* * * * *